Jan. 19, 1960
D. KELLERMAN
2,922,093
COAXIAL TRIMMER CAPACITORS
Filed Jan. 22, 1957
2 Sheets-Sheet 1
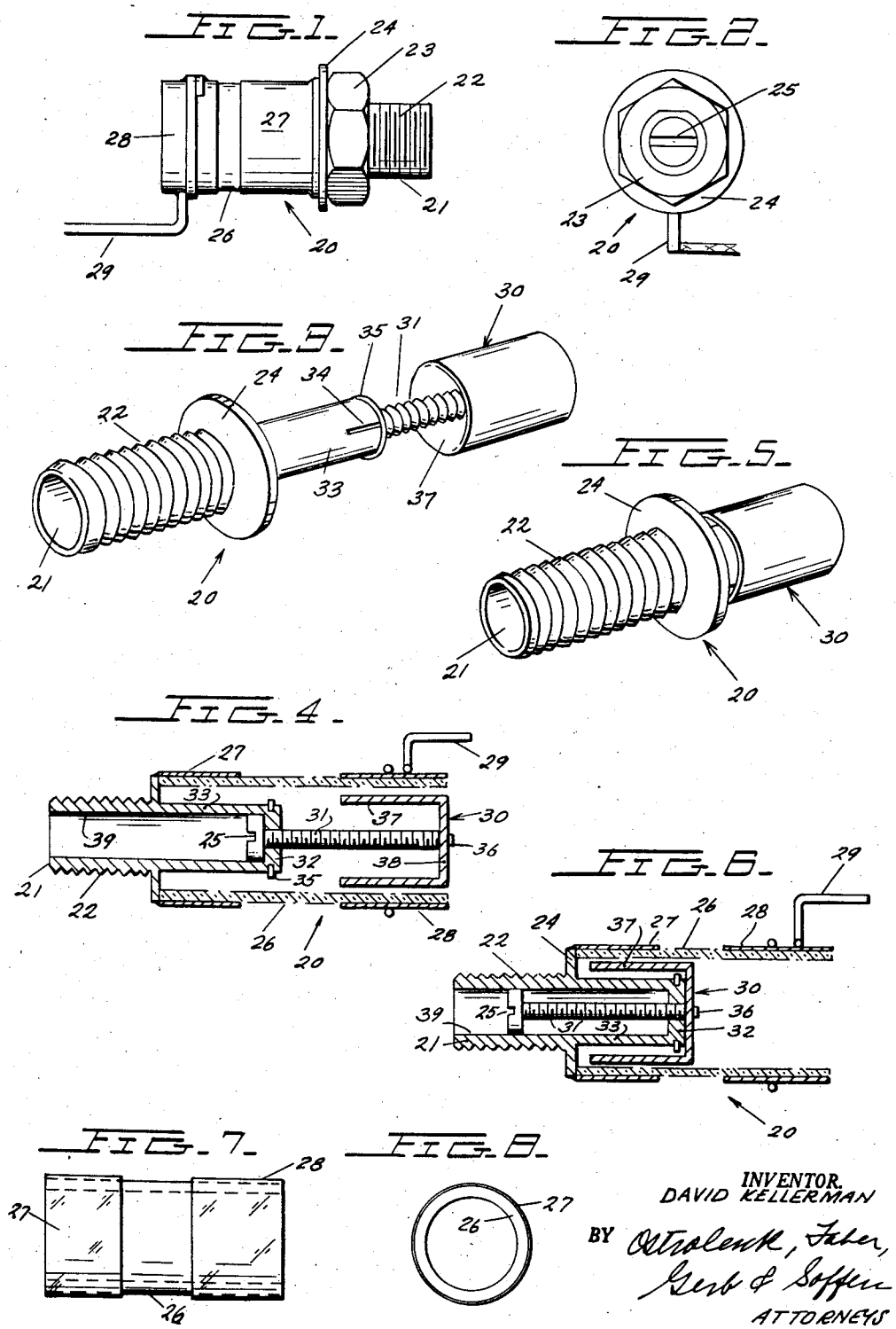
INVENTOR.
DAVID KELLERMAN
BY
ATTORNEYS Jan. 19, 1960
D. KELLERMAN
2,922,093
COAXIAL TRIMMER CAPACITORS
Filed Jan. 22, 1957
2 Sheets-Sheet 2
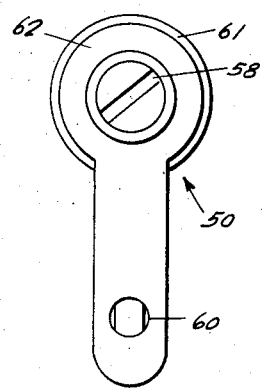
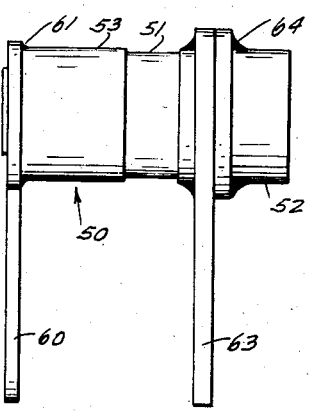
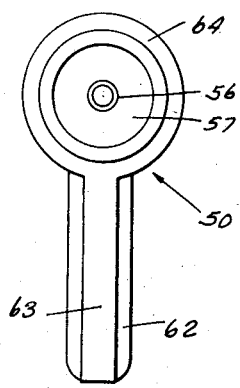
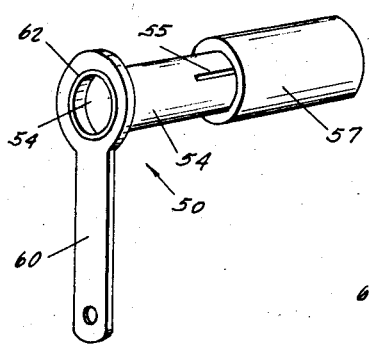
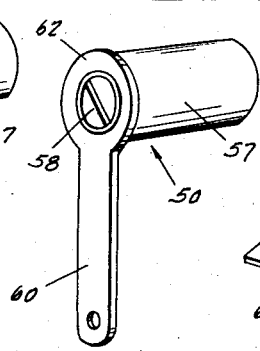
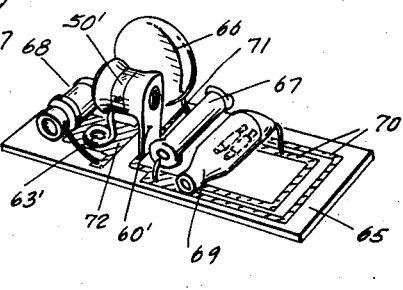
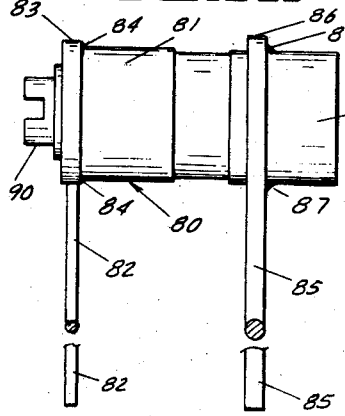
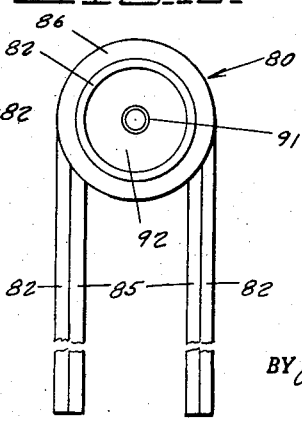
INVENTOR.
DAVID KELLERMAN
BY
ATTORNEYS

United States Patent Office 2,922,093
Patented Jan. 19, 1960

2,922,093
COAXIAL TRIMMER CAPACITORS

David Kellerman, Bayside, N.Y., assignor to JFD Electronics Corporation, Brooklyn, N.Y., a corporation of New York Application January 22, 1957, Serial No. 635,468

4 Claims. (Cl. 317—249)

This invention relates generally to adjustable capacitors and more particularly relates to novel precision trimmer capacitors of the coaxial type capable of subminiature construction and efficient at high megacycle ranges.

The trimmer capacitors of the present invention meet all the exacting requirements of production of electronic equipment by automation and printed circuitry. They are simple of construction and operation; precise of adjustment; stable in extended operational use; and most compact for comparable capacitance range. The invention capacitors may readily be adapted to panel mounted and printed wiring types, as will be set forth hereinafter.

Basically, the novel adjustable capacitors of the present invention embody a telescopic tuning slug (or piston) operable by a self-contained adjustment shaft as a low inductance coaxial assembly within a dielectric cylinder such as glass. The capacity adjusting screw is maintained within the unit's mounting bushing so that ready and sure-footed adjustment is feasible, with no time lost in trying to keep the screw driver in contact with the adjusting screw as in conventional trimmer units. This feature permits mounting the invention capacitors in recessed and blind-hole locations. The adjusting screw and the anti-backlash assembly are within the space normally allotted for the dielectric tube, with a telescopic internal design that has a minimum overall length for a given capacitance range, as compared to comparable prior art condensers.

The adjustment screw or shaft of the trimmer capacitors of this invention is threaded within a split bushing that extends from the mounting post. The split bushing is arranged to exert spring pressure on the threads. The tuning piston is hollow and is arranged to move over the bushing to subtend it with the connected shaft within the bushing as will be described in further detail hereinafter. A metallized dielectric tube is mounted coaxially over the movable piston and connected at one end to the mounting post. The capacitance change is effected by the movement of the tuning piston or slug relative to a fixed metallized band on the dielectric tube. There are mechanical stops provided in an effective and simple manner by the invention construction at both extremities of the piston adjustment. In this manner, the condenser will not come apart if the adjusting screw is turned too far as in conventional coaxial trimmers.

It is accordingly an object of the present invention to provide a novel adjustable coaxial capacitor.

Another object of the present invention is to provide a novel trimmer condenser of minimum length for a given capacitance range.

A further object of the present invention is to provide a novel compact piston type trimmer capacitor of minimum size for a given capacitance range.

Still another object of the present invention is to provide a novel adjustable capacitor having its adjustment shaft fully self-contained throughout the adjustment range of capacitance.

Still a further object of the present invention is to provide an adjustable piston type capacitor with novel mechanical end stops at its adjustment extremities.

Another object of the present invention is to provide a novel trimmer condenser of low inductance and low loss which is efficient for use at high megacycle ranges.

These and further objects of this invention will become apparent from the following description of exemplary embodiments thereof taken in connection with the drawings in which:

Figure 1 is an elevational view of one embodiment of the trimmer capacitor.

Figure 2 is an end view taken from the left side of the capacitor of Figure 1.

Figure 3 is an enlarged view, in perspective, of the internal parts of the capacitor of Figures 1 and 2 in its piston-extended position.

Figure 4 is a cross-sectional view longitudinally through the capacitor shown in Figure 3 with its dielectric tube thereon.

Figure 5 is an enlarged perspective view of the capacitor portion of Figure 3 in its fully retracted position.

Figure 6 is a longitudinal view corresponding to Figure 4, through the capacitor of Figure 5.

Figures 7 and 8 are elevational and end views, respectively, of the metallized dielectric tube of the capacitor of Figures 1 to 6.

Figures 9, 10 and 11 are, respectively, elevational and end views of a second embodiment of the invention trimmer.

Figures 12 and 13, are respectively, extended and retracted views, in perspective, of the internal parts of the capacitor of Figure 9.

Figures 14 and 15 are respective elevation and end views of a modified construction of the trimmer capacitor of Figure 9.

Figure 16 is a perspective view of an electronic printed circuit assembly incorporating an invention trimmer capacitor.

Referring to Figures 1 and 2, the exemplary capacitor 20 comprises mounting post 21 with threads 22 engageable with mounting nut 23. The trimmer condenser 20 is the panel mounted type, with the flange 24 extending from the end of post 21 pressed against one side of a panel, and nut 23 operated to mount capacitor 20 on the panel in the conventional manner. It is to be noted that the adjustment shaft does not extend from trimmer 20 in any way. The slotted head 25 of this shaft is accessible to a screw driver or tool for turning the internal shaft and capacitance adjustment, as will be described.

The dielectric tube 26 has a metallized band 27 which permits ready soldering or other suitable securement with metallic flange 24. Being at the same electrical potential as the internal tuning slug or piston, through the mounting post 21, metallized band 27 has no capacitive effect on the movable piston. The remote region of tube 26 has metallized band 28 which coacts with the internal coaxial piston (not seen in Figure 1) to establish the capacitative action by the trimmer 20. It serves as a cylindrical condenser plate. A connection lead 29 is soldered to condenser band 28 to constitute the "live" terminal of the capacitor 20. In the exemplary embodiment of capacitor 20, dielectric tube 26 is of glass.

Figures 3 and 5 are enlarged perspective illustrations of the internal portion of the capacitor 20 in respective extended and retracted positions of the piston 30 which is assembled coaxially with tube 26 and capacitatively coacts with a longitudinal movement with fixed condenser band 28. Figures 4 and 6 are respective cross-sections through the condenser 20 portions of Figures 3 and 5, with the dielectric tube 26 indicated thereon. The tuning slug or piston 30 is advantageously of Invar and silver-plated. Thus, the capacity settings remain stable over wide ambient temperature changes, as the glass tube 26 and band 28 are also temperature stable together with Invar body 30.

The threaded adjustment shaft 31 coacts with the internally threaded portion in head 32 of bushing 33. Bushing 33 is secured with or extends integrally from mounting post 21. Bushing 33 has a slit 34 across its end section. A spring washer 35 presses across slit 34 to ensure firm engagement of the threads of the bushing at head 32 with the adjustment screw 31, exerting spring tension inwardly on the threads. The tuning slug 30 is connected to the end 36 of adjustment shaft 31 by solder-brazing; other methods may be used including a threaded connection or a peening operation. Thus, rotation of shaft 31 in fixed bushing head 32 causes the shaft to move in or out with respect thereto and moves tuning slug 30 correspondingly longitudinally within tube 26.

The tuning slug or piston 30 is hollow with its tubular body 37 proportioned to subtend or overlap bushing 33. The head 25 of adjustment shaft 31 is of the same diameter as the interior bore 39 of bushing 33 and coextensive post or mounting lug 21. Thus, by making the outer diameter of body 37 of piston 30 close fitted within smooth dielectric tube 26; the assembly of head 25 fitting in bore 39; screw 31 within bushing head 32; and piston 37, within tube 26, a stable movable assembly is effected. No backlash or mechanical displacement once adjusted results from such advantageous construction. Precise capacity adjustment is afforded and maintained in service under severe variation in temperature, humidity and vibration. The pressure by ring 35 across slit 34 effects a firm pressure on the threads of shaft 31 to maintain its settings.

Another important feature of the present invention is the mechanical end stopping incorporated for the extreme inward and outward positions of the capacitor. Figure 4 illustrates the full-out position of piston 30 with its body 37 at maximum capacitative relation with fixed capacity ring 28. The stop is effected by screw head 25 abutting the head 32 of bushing 33. Thus, the capacitor 20 does not "fall apart" as do prior piston condenser constructions. The condenser 20 capacitance is effective from lead 29 through band 28, across to piston body 37, conducted to mounting lug 21 through adjusting screw 31 and bushing head 32 a_d bushing 33. Post 21 is generally (though not necessarily) at ground potential, particularly when mounted on a metallic chassis. Lug 24 and band 27 are at post 21 potential.

Figure 6 illustrates the full-in position of piston 30 with no radial coaction with condenser band 28. The interior end portion 38 of piston 30 abuts head portion 32 of bushing 33 to arrest further motion inwardly thereof. It is noted that the inherent and basic components and their arrangement as capacitor 20 produce the in and out locking of the piston 30. Also, the invention construction keeps head 25 of shaft 31 wholly within protective bore 39 of lug bushing 21—33. This self-contained adjustment shaft protects its being bent or broken, permits direct engagement with a tool for turning it, and reduces the overall length or axial envelope for the capacitor 20. Blind hole or recessed mountings are feasible. Disengagement of the capacitor 20 parts cannot occur during adjustment. An integrated, precise, effective trimmer capacitor results of relatively inexpensive construction.

The dielectric tube 26 is illustrated in Figures 7 and 8. As stated, it is preferably of glass for low dielectric loss, low cost, and good strength. It is suitably plated or metallized along end bands 27 and 28 for the purposes aforesaid. Band 27 is soldered to flange 24 and thus mechanically fastens tube 26 in position in the condenser 20. Band 28 has lead 29 soldered thereto and coacts with the longitudinally movable tuning slug 30 to yield predetermined capacitance values according to the position of piston 30 in tube 26 as effected by the turning of head 25 of adjustment shaft 31. In practice, the capacitance variation is linear with the head 25 turning. Potting or encapsulating of the invention capacitor is feasible since all movable parts remain with the assembly. The novel construction lends itself readily to sub-miniature size without sacrifice in precision, simplicity, cost or other of the stated advantages.

Figures 9 to 13 illustrate another form which my trimmer capacitor may assume in practice. Capacitor 50 has a dielectric tube 51 with a metallized condenser band 52 and body metal band 53, identically to tube 26 of condenser 20. The interior portion of condenser 50 is also the same as that of capacitor 20 with split bushing 54 having slit 55 for operating on an adjustment screw 56 (see Figure 11) engaged with tuning slug 57 and with slotted head 58. Axial movement of piston 57 is effected through head 58 within bore 59. Piston 57 coacts capacitatively with ring 52 as in unit 20. Unit 50, however, is adapted for automation and printed circuit board mounting. Towards this end, a mounting lug 60 extends from the edge 61 of body ring 53 of tube 51 and is firmly secured therewith, as by soldering.

Mounting lug 60 has a circular head 62 through which shaft head 58 is reached. Lug 60 supports bushing 54 fixedly and carries tube 51 as well. Piston 57 is axially movable to produce the capacitance required. Lug 60 is usually at ground potential, though not necessarily. Terminal 63 is soldered at 64 to condenser band 52 to establish the "live" condenser connection. Lead 63 may be of #22 B & S gauge tinned copper wire. The remainder of capacitor 50 is the same as panel type trimmer 20 and functions in the same manner and with the same advantages. Figure 16 illustrates the mounting of lug type printed board trimmer capacitor 50' on a mock-up board 65; other mountings will be obvious.

The generalized electronic circuit of board 65 contains disc capacitor 66, resistor 67, inductance coil 68, and a diode 69, all connected to "printed" wiring 70 on dielectric board 65. Trimmer condenser 50' has lug 60' set in a slot in board 65 and electrically connected to "wire" 71. The lead 63' is coiled at one end and soldered to plate 72. Other modes of attachment and connection of capacitor 50' are, of course, feasible.

Figures 14 and 15 show capacitor 80 of similar construction as unit 50. Modified terminal and mounting connections thereto are used. At the base band 81 end a two-legged wire leg 82, 82 is wrapped at 83 and soldered at 84. Similarly, a two-legged wire leg 85, 85 is wrapped at 86 about condenser band 82 and soldered thereto along 87. Leg 82, 82 may be, for example, of #20 gauge tinned copper wire and leg 85, 85 of #22 gauge. The capacitor 80 is mounted by the four "feet" of the leg sets 82, 85 and electrically connected into the requisite circuit, as will now be understood by those skilled in the art. The capacitor 80 is designed with the slotted head 90 of adjusting screw 91 projecting somewhat beyond the unit 80. Adjustment shaft 91 operates tuning slug 92 as in the capacitors 20 and 50 described.

In exemplary constructions of the invention trimmer capacitors, the following parameters may be considered typical as representing production units:

Voltage rating: 1000 volts D.C.
Operating temperature: —55° C. to +125° C.
Q factor: 700 min. at 50 megacycles.
Dielectric strength: Withstands 1500 volts D.C. for 5 seconds at rated capacitance.
Insulation resistance: 1 million megohms at 500 volts D.C. after 1 min. at 50% ±10% relative humidity.
Torque: 2 to 4 inch ounces (approximate).

In commercial units, with the above characteristics, the following are typical capacitance ranges corresponding to models of differing lengths of the dielectric tube:

| Model | Lengths, inches | Capacitance Range, mmf. |
|---|---|---|
| A | 5/16 | 0.8–4.5 |
| B | 9/16 | 0.8–8.5 |
| C | 1 | 2–20 |
| D | 1 5/8 | 1–30 |

It is, of course, obvious that different parameters and ranges are feasible as the extent of tuning piston swing designed therein and the tube diameters determine such in conjunction with length. Also, it has been found best to make not only the piston shell of Invar but also the adjustment shaft as well as the split bushing.

Nevertheless, it is to be understood that the present invention is not to be construed as limited in any way to the exemplary constructions herein described, nor to the preferred materials or ranges illustrated, since changes and modifications may be made therein which are within the full intended scope of the invention as defined by the appended claims.

I claim:

1. An adjustable electrical component comprising a cylindrical tube with a transverse section having an axial thread, a threaded adjusting shaft of smaller diameter than the tube interior and coactably supported in the threaded section coaxially with said tube, a hollow metallic piston connected to the shaft end that is exterior of said tube and arranged to telescope over said tube, a cylindrical head at the shaft other end of diameter equal to that of the tube interior for rotational juxtaposition therewith, a flange intermediate of and integral with and extending outwardly from said tube, a dielectric form secured to said flange and concentrically surrounding the portion of said tube that contains said transverse section and said piston, and an electrical member carried by said dielectric form in electrically coactable relation with said piston, the shaft head being shaped for engagement with a tool for turning said shaft to axially displace said piston and thereby adjust its electrical relation with said member to preset the electrical parameter of the component, said tube extending sufficiently to contain said shaft head for all adjustment positions of said piston, the exterior of the extending portion of said tube being threaded for a coacting nut and with said flange constituting a mounting post for the component with the extending tube inner surface forming an access opening for the tool and head engagement for the parameter presetting.

2. An adjustable electrical component as claimed in claim 1, with said tube being longitudinally slit across its transverse section and the slit portions thereof being pressed into firm engagement with the adjusting shaft.

3. An adjustable electrical component comprising a cylindrical tube with a transverse section having an axial thread, a threaded adjusting shaft of smaller diameter than the tube interior and coactably supported in the threaded section coaxially with said tube, a hollow metallic piston connected to the shaft end that is exterior of said tube and arranged to telescope over said tube, a cylindrical head at the shaft other end of diameter equal to that of the tube interior for rotational juxtaposition therewith, a flange integral with and extending outwardly from said tube, a dielectric form secured to said flange and concentrically surrounding the portion of said tube that contains said transverse section and said piston, an electrical member carried by said dielectric form in electrically coactable relation with said piston, the shaft head being shaped for engagement with a tool for turning said shaft to axially displace said piston and thereby adjust its electrical relation with said member to preset the electrical parameter of the component, said tube extending sufficiently to contain said shaft head for substantially all adjustment positions of said piston, the extending tube inner surface forming an access opening for the tool and head engagement for the parameter presetting, and an element extending perpendicularly from said flange for mounting of the component.

4. An adjustable electrical component as claimed in claim 3, with said tube being longitudinally slit across its transverse section and the slip portions thereof being pressed into firm engagement with the adjusting shaft, and said linear element being conductive to also ground the component tube.

References Cited in the file of this patent

UNITED STATES PATENTS

| | | |
|---|---|---|
| 2,482,471 | Dowell | Sept. 20, 1949 |
| 2,740,077 | Clarke | Mar. 27, 1956 |
| 2,774,017 | Shapp | Dec. 11, 1956 |

FOREIGN PATENTS

| | | |
|---|---|---|
| 899,967 | France | Sept. 11, 1944 |
| 1,105,390 | France | June 25, 1955 |